US008502992B2

(12) United States Patent
Kurihara

(10) Patent No.: US 8,502,992 B2
(45) Date of Patent: Aug. 6, 2013

(54) IMAGE FORMING SYSTEM AND METHOD FOR SELECTING AN IMAGE FOR A SAMPLE PAPER EJECTION

(75) Inventor: Susumu Kurihara, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 877 days.

(21) Appl. No.: 12/581,591

(22) Filed: Oct. 19, 2009

(65) Prior Publication Data

US 2010/0097625 A1 Apr. 22, 2010

(30) Foreign Application Priority Data

Oct. 21, 2008 (JP) ................................ 2008-270643

(51) Int. Cl.
*G06K 15/00* (2006.01)
*H04N 1/46* (2006.01)

(52) U.S. Cl.
USPC ......... 358/1.12; 358/1.9; 358/1.13; 358/1.15; 358/1.16; 358/504; 399/16; 399/17; 399/81; 399/82; 399/361

(58) Field of Classification Search
None
See application file for complete search history.

(56) References Cited

U.S. PATENT DOCUMENTS

2006/0238811 A1* 10/2006 Soma et al. .................. 358/1.16
2007/0009279 A1* 1/2007 Yamauchi et al. .............. 399/82
2007/0070377 A1* 3/2007 Hirabayashi ................. 358/1.13
2007/0242962 A1* 10/2007 Yamamoto ...................... 399/15

FOREIGN PATENT DOCUMENTS

JP 2004-284323 10/2004
JP 2005-153374 6/2005
JP 2007-118212 5/2007

* cited by examiner

*Primary Examiner* — Miya J Cato
(74) *Attorney, Agent, or Firm* — Finnegan, Henderson, Farabow, Garrett & Dunner, L.L.P.

(57) ABSTRACT

An image forming system, comprises: an image formation unit for forming an image on a paper; a first paper ejection unit for receiving the paper; a second paper ejection unit for receiving the paper as a sample paper in a state that the sample paper is visually checked when sample paper ejection is performed; a first control section for controlling a switching section to eject the sample paper by switching a paper sending destination from the first paper ejection unit to the second paper ejection unit at a time of the sample paper ejection; a second control section for controlling a display section to display thumbnail images; and wherein the first control section performs the sample paper ejection using the image for sample paper ejection selected by a selecting section for selecting the image for sample paper ejection from the thumbnail images displayed in the display section.

6 Claims, 10 Drawing Sheets

IMAGE FORMING SYSTEM AND METHOD FOR SELECTING AN IMAGE FOR A SAMPLE PAPER EJECTION

BACKGROUND OF THE INVENTION

1. Field of the Invention

The present invention relates to an image forming system and an image forming method.

2. Related Art

An image forming apparatus continuously performing the processing of forming an image on a paper to eject the paper has been known so far. Moreover, it is general that an image forming apparatus capable of producing a large amount of copies of image formation is equipped with a large-capacity stacker and ejects sheets of paper after image formation to be stacked in the stacker. In order to house a large amount of sheets of paper in the stacker, the inside of the stacker is closed by a door, and then the stacker is configured so that it is difficult to visually check the content of the image formation on the paper.

In such an image forming apparatus, if a large amount of color images is continuously formed, then an aged deterioration of the density and tint of the color images arises, so that the images that a user does not desire are sometimes formed. Accordingly, an image forming apparatus equipped with a sample paper ejecting function of performing sampling image formation in the process of image forming processing to eject the paper on which the sampling image is formed onto a catch tray, which is easy to visually check, has been proposed (see, for example, Japanese Patent Application Laid-Open Publications No. 2005-153374 and No. 2004-284323).

As the sample paper ejecting function, for example, there are the mode of automatically performing sample paper ejection when a predetermined condition is satisfied, for example, every 1,000 copies of image formation (Japanese Patent Application Laid-Open Publication No. 2005-153374), the mode of performing sample paper ejection when an operation section for sample paper ejection is manually operated (Japanese Patent Application Laid-Open Publication No. 2004-284323), and the like.

This sample paper ejection aims to check the aged deterioration of the density and tint of a color image. Consequently, the image to be ejected as a sample paper is desirable to be easy for a user to find aged deterioration. But, because the sample paper ejecting functions disclosed in Japanese Patent Application Laid-Open Publications No. 2005-153374 and No. 2004-284323 are not the one to perform the instruction of sample paper ejection by actually viewing an image, the functions have the problem of the difficulty of selecting the image the aged deterioration of which is easy to find.

SUMMARY OF THE INVENTION

It is, therefore, a main object of the present invention to provide an image forming system and an image forming method capable of selecting an image suited for a sample paper ejection.

To achieve at least one of the aforementioned objects or other objects, an image forming system reflecting one aspect of the present invention, an image forming system, comprises:

an image formation unit for forming an image relating to a job on a paper;

a first paper ejection unit for receiving the paper on which the image is formed;

a second paper ejection unit for receiving the paper as a sample paper on which the image is formed in a state that the sample paper is visually checked when sample paper ejection is performed;

a switching section for switching a paper sending destination between the first paper ejection unit and the second paper ejection unit;

a first control section for controlling the switching section to eject the sample paper by switching the paper sending destination from the first paper ejection unit to the second paper ejection unit at a time of the sample paper ejection;

a storing section for storing image data of the image relating to the job;

a second control section for controlling a display section to display thumbnail images based on the image data stored in the storing section; and a selecting section for selecting the image for sample paper ejection to be used for the sample paper ejection from the thumbnail images displayed in the display section on the basis of a user's operation, wherein the first control section performs the sample paper ejection using the image for sample paper ejection selected by the selecting section.

In accordance with a second aspect of the present invention, an image forming method, comprises:

an image formation step of forming an image relating to a job on a paper;

a first paper ejection step of receiving the paper on which the image is formed by a first paper ejection unit;

a second paper ejection step of receiving the paper as a sample paper on which the image is formed by a second paper ejection unit in a state that the sample paper is visually checked when sample paper ejection is performed;

a switching step of switching a paper sending destination between the first paper ejection unit and the second paper ejection unit by a switching section;

a first control step of controlling the switching section to eject the sample paper by switching the paper sending destination from the first paper ejection unit to the second paper ejection unit at a time of the sample paper ejection;

a storing step of storing image data of the image relating to the job;

a second control step of controlling a display section to display thumbnail images based on the image data stored in the storing step; and a selecting step of selecting the image for sample paper ejection to be used for the sample paper ejection from the thumbnail images displayed in the display section on the basis of a user's operation, wherein the first control step performs the sample paper ejection using the image for sample paper ejection selected by the selecting step.

According to first and second aspects, since thumbnail images can be seen to select an image for sample paper ejection, it is possible to select the image for sample paper ejection by viewing an actual image the aged deterioration of which is easy to find. Accordingly, since it is possible to select the image the aged deterioration of which is easy to find, it is possible to reduce the processes to perform sample paper ejection again after performing sample paper ejection using an image which is not suited for the sample paper ejection once, and reduce the costs for waste sample paper ejection.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein.

DETAILED DESCRIPTION OF THE PREFERRED EMBODIMENTS

In the following, an embodiment of the present invention will be described with reference to the accompanying drawings.

Figure 1:
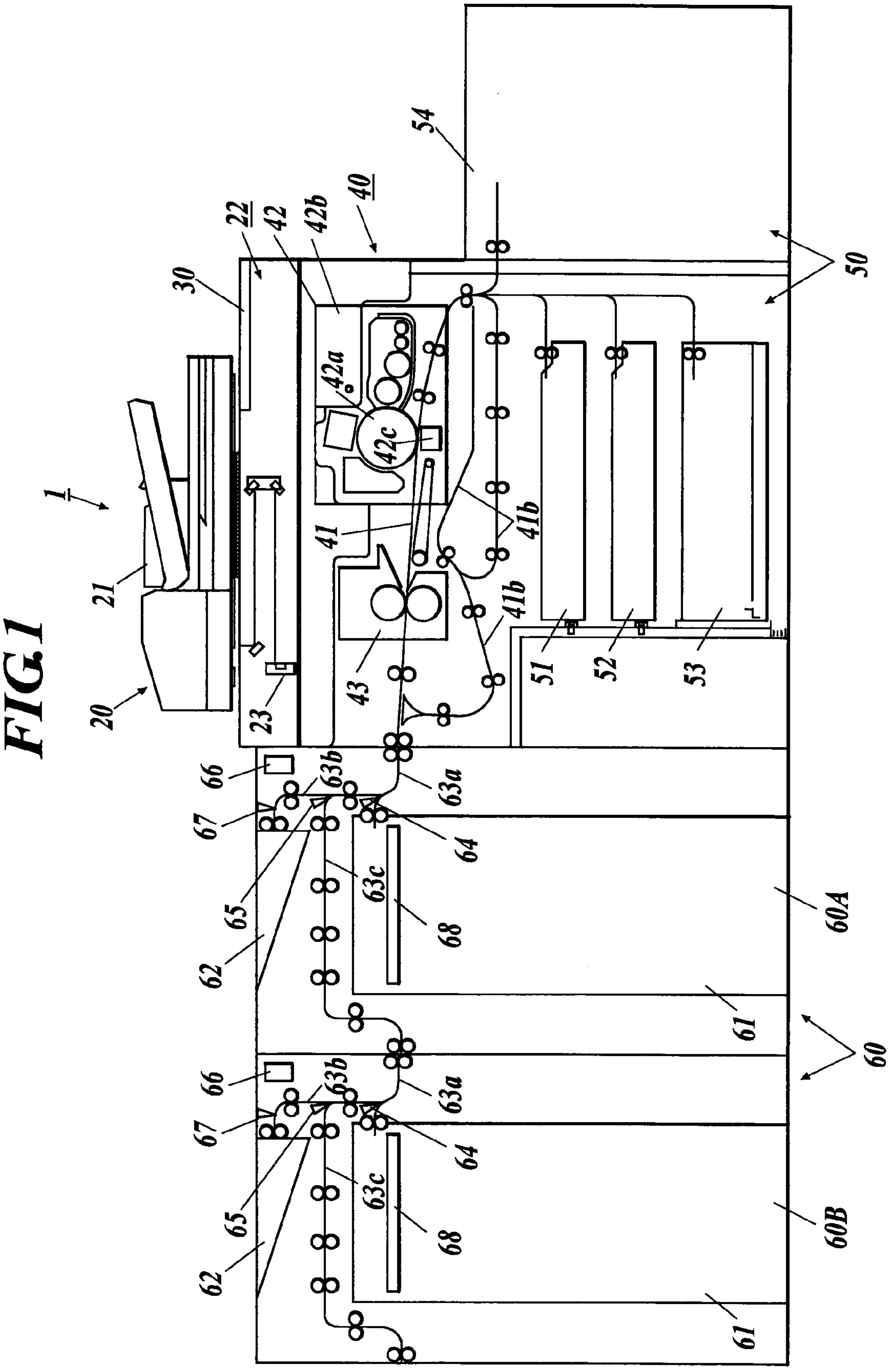
FIG. 1 is a whole configuration diagram of an image forming apparatus of an embodiment of the present invention.
Figure 2:
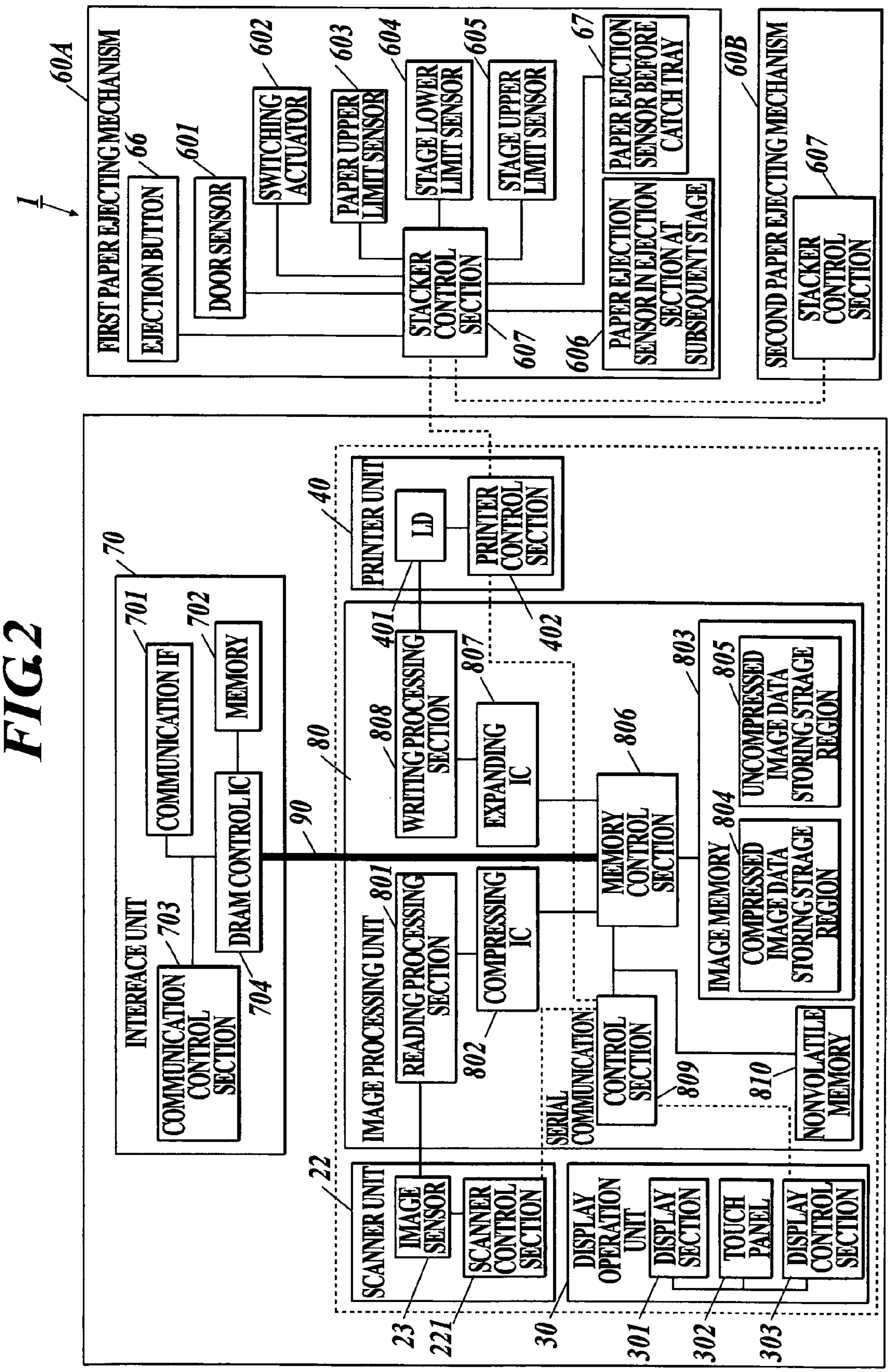
FIG. 2 is a block diagram of a control configuration of the image forming system of the embodiment of the present invention.

FIG. 1 is the whole configuration diagram of an image forming apparatus of an embodiment of the present invention, and FIG. 2 is a block diagram of the control configuration of an image forming system of the embodiment of the present invention.

The image forming system (image forming apparatus) 1 of this embodiment is an apparatus of continuously performing image formation for a plurality of copies each including a plurality of pages to continuously eject the sheets of paper subjected to the image formation. The image forming apparatus 1 is configured to be able to perform the setting input of the number of copies to be subjected to image formation, the content of the image of each page, the type of paper, the side (one side, both sides, or the like) to be subjected to the image formation, and the like, as an image formation job (hereinafter referred to as a job). The image forming apparatus 1 is configured to continuously execute the image formation in accordance with a job by an instruction of the execution of the job after the setting input of the job.

As shown in FIG. 1, the image forming apparatus 1 is equipped with an image reading unit 20 for reading the content of an image to be subjected to image formation, a display operation unit 30 performing a display for an operation and an input of a user's operator command, a printer unit 40 for performing image formation on a paper (a sheet), a sheet feeder 50 capable of the supply of a plurality of types of paper, and paper ejecting mechanisms 60 performing the ejection of the paper subjected to image formation.

The image reading unit 20 is equipped with a scanner unit 22 for scanning an original placed on a platen glass with an image sensor 23, such as a charge coupled device (CCD), to change an original image into data, an auto document feeder (ADF) 21 sending a plurality of originals to enable the scanner unit 22 to continuously read the originals, and the like.

The printer unit 40 performs image formation by, for example, an electrophotographic printing system, and is equipped with an image forming section 42 transferring a toner image based on image data onto a paper, a fixing section 43 fixing the toner image, a conveyance path 41 conveying a fed paper to the image forming section 42, a conveyance path 41*b* for both side processing to reverse a paper subjected to image formation on one side thereof to send the paper to the image forming section 42 again, and the like. The image forming section 42 includes a photosensitive drum 42*a*, on the surface of which an image pattern is formed by exposure, a laser unit 42*b* performing an exposure scan of the surface of the photosensitive drum 42*a* on the basis of image data, a transferring apparatus 42*c* transferring toner to a paper, and the like. The image forming section 42 is configured to transfer toner onto a paper in the shape of the image formed on the photosensitive drum 42*a* by making the paper pass between the photosensitive drum 42*a* and the transferring apparatus 42*c*.

The sheet feeder 50 is equipped with a plurality of paper feeding trays 51-53 housing a plurality of types of paper different from each other in, for example, paper type and size to perform paper feeding independently, a paper feeding unit 54 housing a large amount of paper to perform paper feeding, and the like.

Each of the paper ejecting mechanisms 60 includes a stage 68 moving up and down. Each of the paper ejecting mechanisms 60 is further equipped with a stacker 61, as a first paper ejection unit, which houses a large amount of sheets of paper subjected to image formation thereon in the state of being stacked on the stage 68, a catch tray 62, as a sample paper ejection unit (second paper ejection unit), which is exposed to the outside to receive the ejected sheets of paper subjected to image formation in the state capable of being viewed, conveyance paths 63*a*-63*c* sending the paper sent from the printer unit 40 to the stacker 61, the catch tray 62, or the paper ejecting mechanism 60 at the subsequent stage, switching pieces 64 and 65 switching the paper sending destinations in these conveyance paths 63*a*-63*c*, an ejection button 66 for taking out the stacked paper in the stacker 61 in the process of image forming processing, a paper ejection sensor 67 detecting the ejection of a paper onto the catch tray 62, and the like. The switching pieces 64 and 65 are configured to be rotated by actuators to switch the paper sending destinations.

The image forming apparatus 1 of the present embodiment is equipped with the following control configuration in addition to the above-mentioned configuration. That is, the image forming apparatus 1 is provided with an interface unit 70 for receiving image data for image formation from an external terminal, and an image processing unit 80 for storing and reading image data for image formation.

The interface unit 70 is provided with a communication interface (communication IF) 701 for being connected to, for example, a local area network (LAN) to perform the transmission and reception of data, a memory 702 primarily storing the image data received from an external terminal through the communication interface 701, a dynamic random access memory (DRAM) control integrated circuit (IC) 704 performing the reading and writing of data to the memory 702 or performing the inputting and outputting of data with the image processing unit 80 through a bus 90, a communication control section 703 performing the overall control of the interface unit 70, and the like.

Moreover, the image processing unit 80 is provided with a reading processing section 801 receiving a read signal transmitted from the image sensor 23 in the scanner unit 22 to convert the received read signal into image data, a compressing IC 802 performing the compressing processing of the read image data, an image memory (storing section) 803 storing image data, a compressed image data storing storage region 804 set for storing compressed image data in the storage region in the image memory 803, an uncompressed image data storing storage region 805 set for primarily storing uncompressed image data transmitted from an external terminal, a memory control section 806 to perform the control of the reading and writing of data to the image memory 803, an expanding IC 807 performing the expanding processing of compressed image data, a writing processing section 808 outputting a signal for image formation to a laser diode 401 of the printer unit 40 on the basis of expanded image data, a nonvolatile memory 810 storing set data and the like, a control section 809 performing serial communication with a scanner control section 221, a display control section (second control section) 303, and a printer control section 402 provided on the scanner unit 22, the display operation unit 30, and the printer unit 40, respectively, to perform synchronous control of each section, and the like.

Moreover, the scanner unit 22 is provided with the scanner control section 221 performing the control processing pertaining to image reading in addition to the aforesaid image sensor 23.

Moreover, the display operation unit 30 is provided with a display section 301, such as a liquid crystal panel, a touch panel (selecting section) 302 arranged on the display section 301, and the display control section 303 performing the display control of the display section 301, the signal inputting processing from the touch panel 302, and the like. The display control section 303 makes the display section 301 display thumbnail images on the basis of the image data of the images relating to the jobs stored in the image memory 803.

Moreover, the printer unit 40 is equipped with the laser diode (LD) 401 of the laser unit 42*b* performing exposure processing, and the printer control section 402 performing the control processing pertaining to image forming processing.

Each of the paper ejecting mechanisms 60 (60A and 60B) is equipped with a door sensor 601 detecting the opening of the door closing the inside of the stacker 61, a switching actuator 602 making the switching pieces 64 and 65 independently rotate in order to switch the conveyance destination of a paper, a paper upper limit sensor 603 detecting the arrival of the paper stacked on the stage 68 at the upper limit thereof, a stage lower limit sensor 604 detecting the arrival of the stage 68 at the lower limit position thereof, a stage upper limit sensor 605 detecting the arrival of the stage 68 at the upper limit position thereof, a paper ejection sensor 606 detecting the ejection of a paper to the paper ejecting mechanism 60 at the subsequent stage, a stacker control section (first control section) 607 collectively controlling the processing of the paper ejecting mechanism 60, and the like, in addition to the ejection button 66 and the paper ejection sensor 67 mentioned above. The switching pieces 64 and 65, the switching actuator 602, and the stacker control section 607 constitute a switching section. The switching actuator 602 rotates the switching pieces 64 and 65 under the control of the stacker control section 607, and the switching pieces 64 and 65 prevent either of the conveyance paths 63*b* and 63*c*. Thereby paper is guide to the other side.

Each of the paper ejecting mechanisms 60 can be configured to be a unit, and is made to be capable of being connected to each other as a cascade connection of a plurality of units. If a plurality of units is connected, then a plurality of the configurations of the paper ejecting mechanisms 60 is provided. In FIG. 2, the configuration of each section of a second paper ejecting mechanism 60 is omitted. Moreover, if a plurality of units is connected to each other, then the stacker control section 607 of a first paper ejecting mechanism 60 is connected to the printer control section 402 in the printer unit 40 in the state capable of performing serial communication, and the synchronous control and the like of the processing of both of them are made to be achieved. The stacker control section 607 of the second and after paper ejecting mechanisms 60 are connected to the stacker control section 607 of the paper ejecting mechanism 60 at the preceding stage in the state of capable of performing serial communication, and the synchronous control and the like of the processing of both of them is made to be achieved.

FIGS. 3A-E show the explanatory diagrams of the function of the stacker 61 of each of the paper ejecting mechanisms 60.

Figure 3E:
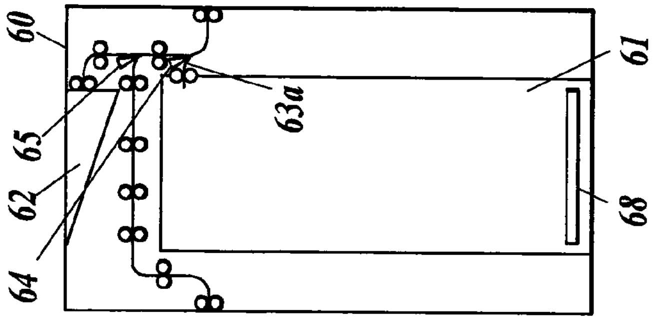
FIG. 3E shows an explanatory diagram of a function of the stacker of the paper ejecting mechanism.
Figure 3D:
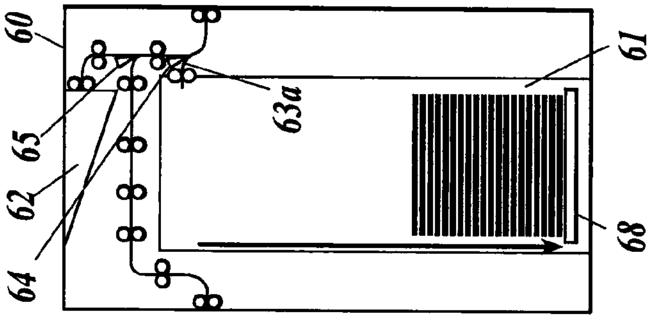
FIG. 3D shows an explanatory diagram of a function of the stacker of the paper ejecting mechanism.
Figure 3C:
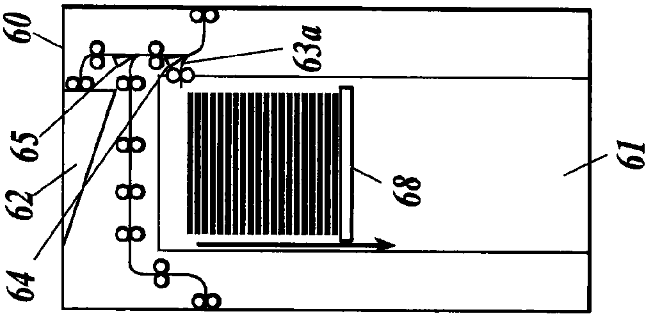
FIG. 3C shows an explanatory diagram of a function of the stacker of the paper ejecting mechanism.
Figure 3B:
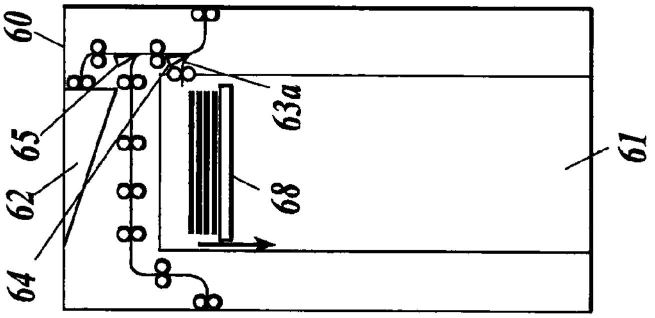
FIG. 3B shows an explanatory diagram of a function of the stacker of the paper ejecting mechanism.
Figure 3A:
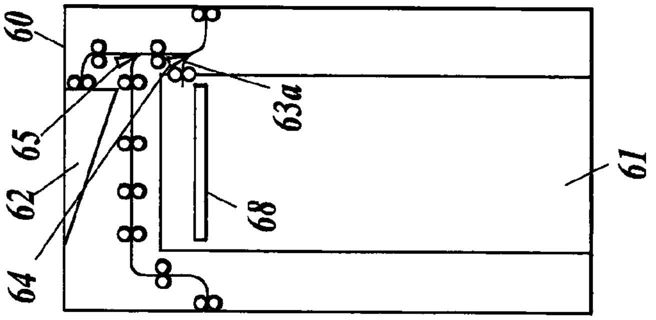
FIG. 3A shows an explanatory diagram of a function of a stacker of a paper ejecting mechanism.

In the image forming processing mentioned above, a paper subjected to image formation and continuously sent to each of the paper ejecting mechanisms 60 is processed on the inside of the paper ejecting mechanism 60 as follows. That is, as shown in FIG. 3A, the stage 68 is made to be in the state of ascending to the upper limit position thereof in the state in which no sheets of paper are stacked thereon at the time of starting the image forming processing. Here, the door (not shown) of the paper ejecting mechanism 60 is made to be in its closed state, and the inside of the stacker 61 is in the state of being invisible from the outside.

When a paper subjected to image formation is sent from the printer unit 40 to the carry-in entrance of the paper ejecting mechanism 60 in this state, the paper is conveyed through the conveyance path 63*a* to be sent to the inside of the stacker 61 by the guidance of the switching piece 64. Then, the paper is stacked on the stage 68. As a plurality of sheets of paper is stacked on the stage 68 by the repetition of such processing, the stage 68 gradually descends on the basis of the sensor output of the paper upper limit sensor 603 with the position of the paper at the uppermost level kept almost at a fixed position as shown in FIG. 3B. Then, as shown in FIG. 3C, many sheets of paper subjected to image formation are gradually stacked on the stage 68.

Moreover, when a user desires to take the sheets of paper subjected to image formation out of the stacker 61, the user depresses the ejection button 66. When the user depresses the ejection button 66, the stage 68 descends to the lowermost level and stops as shown in FIG. 3D, and consequently the user can open the door of the paper ejecting mechanism 60 in this state to take the sheets of paper subjected to image formation out of the inside of the paper ejecting mechanism 60. Then, as shown in FIG. 3E, when the user has taken out the sheets of paper and closes the door of the paper subjecting mechanism 60, the stage 68 ascends again on the basis of a sensor signal indicating the closing of the door as shown in FIG. 3A.

In the aforesaid configuration, the control section 809 in the image processing unit 80 is configured to execute sample image selecting processing, sample paper ejecting processing, and the like, which will be described later, in cooperation with the display control section 303 in the display operation unit 30, the printer control section 402 in the printer unit 40, and the stacker control section 607 in the paper ejecting mechanism 60.

Here, as the processing operations of the image forming apparatus 1 configured as above, the inputting processing of image data, image forming processing, sample image selecting processing, and sample paper ejecting processing will be described in order.

[Inputting Processing of Image Data]

There are two types of the inputting processing of image data: the method of reading the image of an original by using the image reading unit 20, and the method of transmitting image data from an external terminal through the interface unit 70.

In the image data inputting processing using the image reading unit 20, a user first uses the ADF 21 to send the original or places the original on the platen glass to operate the scanner unit 22, and thereby the image of the original is captured by the image sensor 23 as an image signal. Then, the image signal is converted into image data by the reading processing section 801, and is subjected to compressing processing by the compressing IC 802 next. Then, the compressed image data is stored in the storage region 804 in the image memory 803 through the memory control section 806.

In the image data inputting processing using the interface unit 70, the image data transmitted from the external terminal is first received through the communication interface 701, and is temporarily stored in the memory 702 in the interface unit 70 by the DRAM control IC 704. Next, the image data is transferred to the storage region 805 in the image memory 803 through the DRAM control IC 704 in the interface unit 70, the bus 90, and the memory control section 806 in the image processing unit 80, and next the transferred image data is transmitted to the compressing IC 802 through the memory control section 806 to be subjected to compressing processing. Then, the compressed image data is stored in the storage region 804 in the image memory 803 through the memory control section 806 again.

[Image Forming Processing]

The image forming processing for one page is executed as follows. That is, first, the memory control section 806 reads the image data to be transferred onto a paper out of the storage region 804 in the image memory 803 to be transmitted to the expanding IC 807. Then, the read image data is expanded by the expanding IC 807 to be transmitted to the writing processing section 808. The writing processing section 808 transmits the image signal based on the expanded image data to the laser diode 401 at predetermined timing, and the laser diode 401 performs laser outputting on the basis of the image data to the photosensitive drum 42*a* to form an exposed pattern based on the image data on the surface of the photosensitive drum 42*a*. Moreover, in parallel with these pieces of processing, the printer control section 402 in the printer unit 40 rotates a not-shown drive motor to convey a paper on the conveyance paths 41 and 41*b*, and the printer control section 402 makes the paper pass between the exposed photosensitive drum 42*a* and the transferring apparatus 42*c*. Thereby, a toner image based on the image data is formed on the paper. Next, the paper is sent to the fixing section 43, and the toner adhering to the paper is fixed. After that, the paper is sent to the paper ejecting mechanism 60. Then, such processing is repeatedly executed for the set number of copies each including a plurality of pages on the basis of the content of the job set in the nonvolatile memory 810 or the like.

[Sample Paper Ejecting Processing]

The sample paper ejecting processing is the processing of performing sampling image formation apart from the image formation of a set job to eject the paper subjected to the sampling image formation to the catch tray 62 in each of the paper ejecting mechanisms 60 in the course of continuously performing the image formation of a plurality of copies each including a plurality of pages on the basis of the set job in order to visually check the occurrence of any abnormalities in the image formation, such as the lowering of the density of transferred toner.

The image forming apparatus 1 of this embodiment is equipped with automatic sample paper ejecting processing and manual sample paper ejecting processing as the sample paper ejecting processing. The automatic sample paper ejecting processing automatically performs sample paper ejection processing in synchronization with a sample paper ejection output period set by a user in advance before the image forming processing. The manual sample paper ejecting processing performs sample paper ejection in response to an operation of a user in process of the image forming processing.

To put it concretely, the automatic sample paper ejecting processing is the processing performing the following processes. That is, a sample paper ejection output period of performing the sample paper ejection to the catch tray 62 is previously set. At the time of arriving at the sample paper ejection output period in course of the execution of the image forming processing based on a job, the paper sending destination is switched from the stacker 61 to the catch tray 62 by the switching pieces 64 and 65 to eject a piece of sample paper to the catch tray 62.

As the sample paper ejection output period, a user selects the image of an arbitrary page image P from the images on a thumbnail screen G (see FIGS. 5 and 6) to set the selected page image P as the image for sample paper ejection, and the time point at the time of arriving at the page image P in the course of the image forming processing is determined as the sample paper ejection output period.

Moreover, it is also possible to set the interval of the copies for performing the sample paper ejection of a paper on which the page image P is formed. In this case, the paper on which the page image P is formed is ejected as the sample paper every interval of set copies.

Moreover, it is also possible to set the sample paper ejection output period so as to perform sample paper ejection every predetermined page interval without selecting any specific page image P.

On the other hand, the manual sample paper ejecting processing is the processing performing the following processes. That is, when a user selects an arbitrary page image P from the images on the thumbnail screen G in the course of the image forming processing based on a job, the paper sending destination of a paper is switched from the stacker 61 to the catch tray 62 by the switching pieces 64 and 65 at predetermined timing, which will be described later, and a sample paper is ejected to the catch tray 62.

[Selection Processing of Image for Sample Paper Ejection]

The selection processing of an image for sample paper ejection is the processing of selecting an image for sample paper ejection to be used for the sample paper ejecting processing.

The image forming apparatus 1 of this embodiment is configured so as to be able to select an image for sample paper ejection by a user's operation from the thumbnail images displayed in the display section 301. When an image for sample paper ejection is selected from the thumbnail images by a user's operation, the image forming apparatus 1 executes the selection processing of an image for sample paper ejection.

The selection processing of an image for sample paper ejection includes the method of executing the selection processing when an image for sample paper ejection is selected by a user's operation in the course of image forming processing and the method of executing the selection processing by using an image for sample paper ejection set (or selected) by a user in advance.

When an image for sample paper ejection is selected by a user's operation in the course of image forming processing, the control section 809 judges whether the selected image for sample paper ejection is the one scheduled to be output to the stacker 61 hereafter or not. If the selected image is the one to be scheduled to be output, then the control section 809 performs sample paper ejection at the output timing of the image for sample paper ejection.

On the other hand, if the selected image for sample paper ejection is not the one scheduled to be output to the stacker 61 hereafter, then the control section 809 performs sample paper ejection at the timing of the execution of the sample paper ejection instruction of the image for sample paper ejection.

Moreover, in the case of using the image for sample paper ejection set (selected) by a user in advance, first, an image for sample paper ejection is selected by a user's operation in the thumbnail screen displayed in the display section 301 before starting the image forming processing. The control section 809 specifies the period of outputting a paper on which the selected image for sample paper ejection is formed as a sample paper ejection output period. When the time comes to the sample paper ejection output period during image forming processing, the control section 809 switches a paper sending destination from the stacker 61 to the catch tray 62 to perform sample paper ejection.

The method of previously setting the image for sample paper ejection is preferably used in the case of a job of performing the image formation of a plurality of copies. That is, because sample paper ejection is performed when the time comes to the period of outputting a paper on which the image for the sample paper ejection specified on the thumbnail screen is formed, the same image is always output as a sample in the job of outputting the plurality of copies, and the aged deteriorations of the images can be easily recognized at a glance.

Here, screen examples displayed in the display section 301 will be concretely described with reference to FIGS. 4-6.

Figure 4:
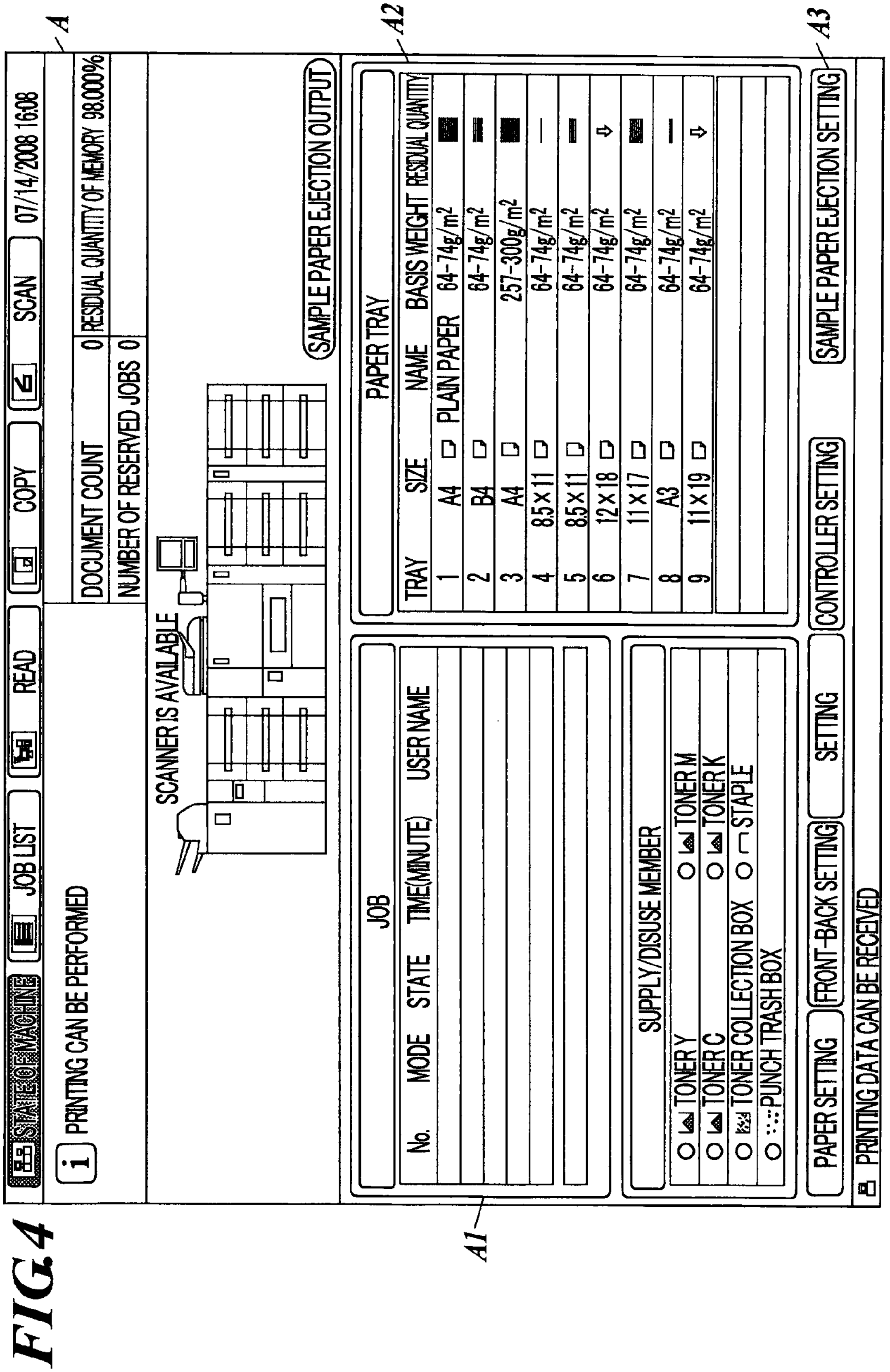
FIG. 4 shows a basic screen to be displayed during execution of a job.

FIG. 4 shows a basic screen A to be displayed during the execution of a job.

On the basic screen A, a job display area A1, a paper tray display area A2, a sample paper ejection setting button A3, and the like are displayed.

In the job display area A1, a "NO." indicating the number of each job, a "mode" indicating the conditions of image formation, such as both side printing/one side printing, a "state" indicating the progress situation of each job, such as in the course of image forming processing/on standby, a "time (minute)" indicating the processing time of a job, and a "user name" indicating a user who has requested a job are displayed.

In the paper tray display area A2, the "size," the "name," the "basis weight," and the "residual quantity" of each paper stored in the paper feeding trays 51-53 are displayed.

Figure 5:
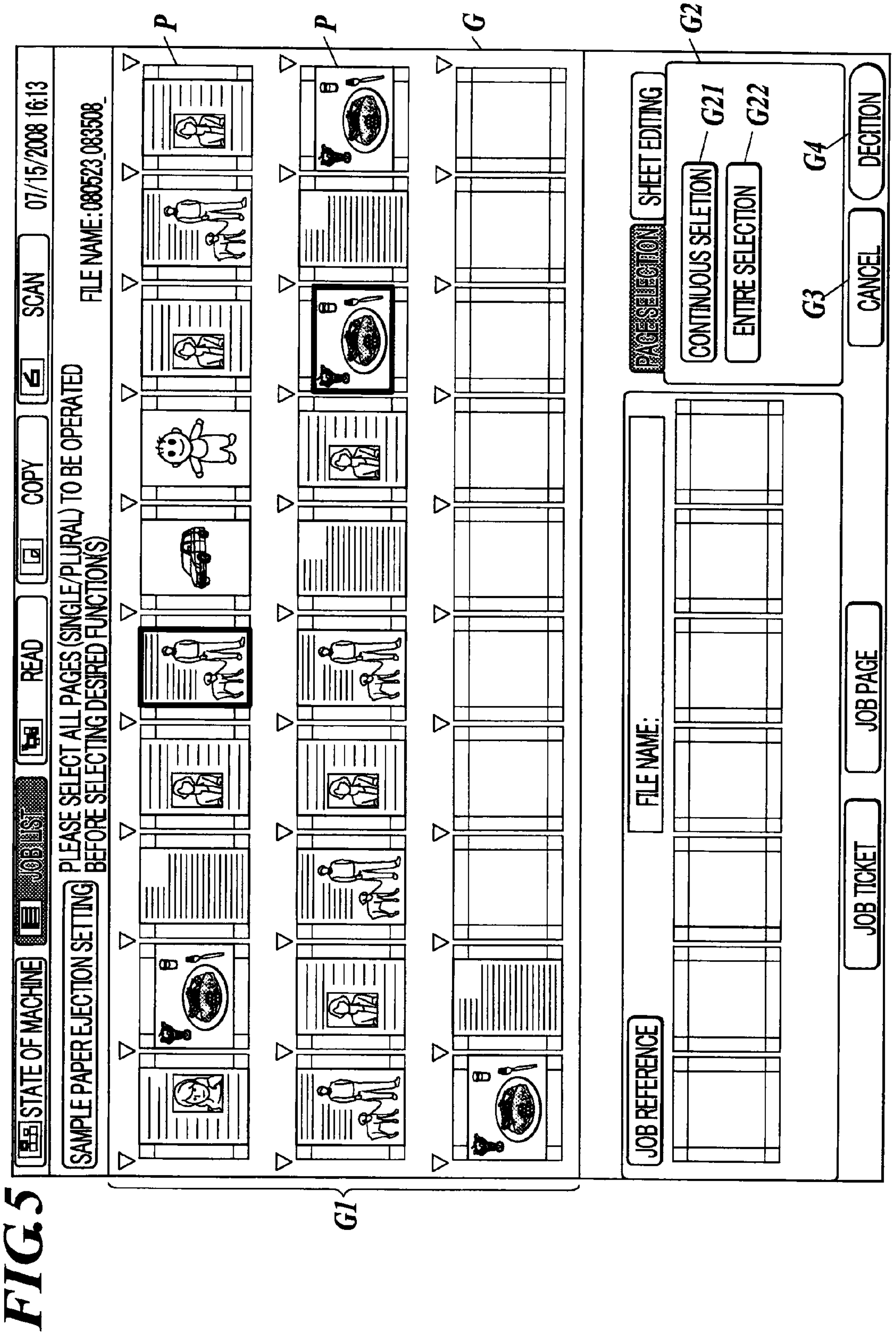
FIG. 5 shows an example of the thumbnail screen.
Figure 6:
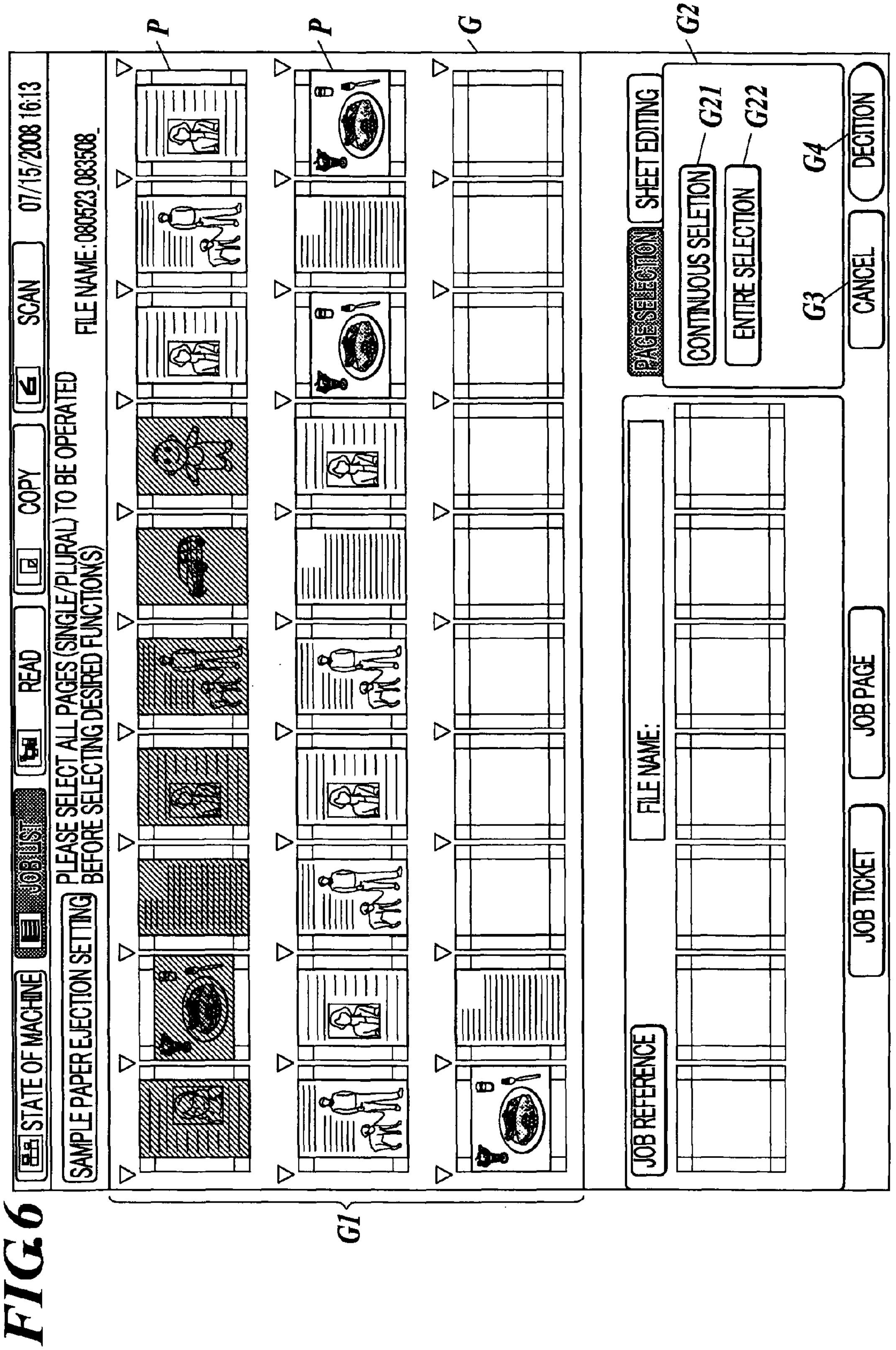
FIG. 6 shows an example of a state in which half-tone dot meshing is performed to thumbnail images shown in FIG. 5.

The sample paper ejection setting button A3 is a button for making the display section 301 display the thumbnail screen G (see FIGS. 5 and 6).

To put it concretely, when the sample paper ejection setting button A3 is specified by an operation of a user, the screen of the display section 301 is switched to a job list screen (not shown) displaying a list of the jobs presently under execution and jobs waiting to be executed (on standby) in the order of reservations, and specifying one job on the job list screen switches the screen of the display section 301 from the job list screen to the thumbnail screen G.

Incidentally, the operations of a user are performed by depressing various setting buttons displayed on the basic screen A from above the screen.

FIG. 5 shows an example of the thumbnail screen G.

On the thumbnail screen G, a page image displaying area G1, a page selecting area G2, a cancel button G3, a decision button G4, and the like are displayed.

The page image displaying area G1 is an area in which a plurality of page images P is displayed. A user can select an image for sample paper ejection by performing touch input of a page image P. In the page image displaying area G1, frames capable of displaying, for example, 30 page images P at the maximum are formed, and a thumbnail image is displayed in each frame. If the number of images is less than 30, only frames are displayed in the residual parts. Moreover, if all page images do not fall in the page image displaying area G1 of a screen, then the page editing screen is adapted to be able to display all of the page images by switching a plurality of screens.

FIG. 5 shows an example of selecting a fifth page image from the left side on the upper row and an eighth page image from the left side in the middle row.

The page selecting area G2 is an area in which input buttons pertaining to the page selection of sample paper ejection are shown. In the page selecting area G2, a continuous selection button G21, an all selection button G22, and the like are displayed.

The continuous selection button G21 is a button enabling a user to continuously select the input of page images P. The all selection button G22 is a button enabling a user to select all of the page images P displayed in the page image displaying area G1 at one time.

The cancel button G3 is a button for cancelling the editing of an image performed on the thumbnail screen G. The decision button G4 is a button for performing the decision of the editing of an image performed on the thumbnail screen G.

In the manual sample paper ejecting processing, when a user selects an image for sample paper ejection on the thumbnail screen G to depress the decision button G4, the sample paper ejection of the image for sample paper ejection is executed at predetermined timing.

Moreover, when a user selects an image for sample paper ejection on the thumbnail screen G to depress the decision button G4 before image forming processing in the automatic sample paper ejecting processing, the sample paper ejection is executed in the setting of the output period of the image for sample paper ejection as the sample paper ejection output period.

Moreover, in the image forming apparatus 1 of this embodiment, it is also possible to set an interval of copies to eject a paper on which an image for sample paper ejection is formed as a sample paper on a not-shown sample period setting screen. In this case, the paper on which the image for sample paper ejection is formed is ejected as a sample paper every set interval of copies.

Moreover, it is also possible to set the sample paper ejection output period so as to perform sample paper ejection every predetermined interval of pages without selecting any images for sample paper ejection.

FIG. 6 shows an example of a state in which half-tone dot meshing is performed to the page image displaying area G1.

The page images P in the page image displaying area G1 are set to be subjected to the half-tone dot meshing according to a job output.

To put it concretely, when image forming processing is started, the half-tone dot meshing is performed to the image page according to the page of the image forming processing under execution, and thereby a user can grasp the progress situation of a job. For example, in FIG. 6, it is shown that image forming processing has been started up to a seventh page image from the left side in the upper row.

Incidentally, the image forming apparatus 1 of the present embodiment is configured so as to be able to select a page image P, even if it is subjected to the half-tone dot meshing (or if it's output has been completed), as an image for sample paper ejection.

Next, the operation of the image forming apparatus 1 in the present embodiment will be described with reference to FIGS. 7-10.

Figure 7:
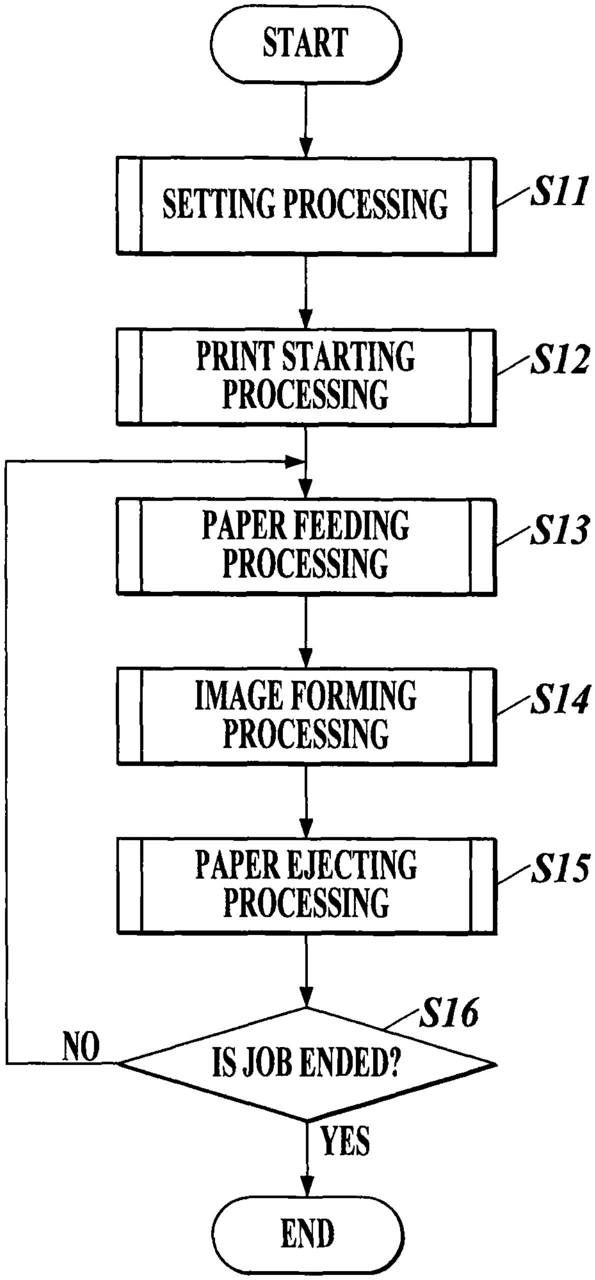
FIG. 7 is a flow chart showing processing processes of image forming processing based on a job.

FIG. 7 is a flow chart showing the processing processes of the image forming processing based on a job.

Incidentally, as the premises of the image forming processing, it is supposed that the control section 809 has executed the initialization processing to be executed at the time of the power activation of the image forming apparatus 1, the check of a paper jam before starting a job, and the like, and that the image forming apparatus 1 is in its standby state.

A user can input each of the settings with regard to the image data relating to the job, such as the setting of the size of paper and the setting of the number of copies, through the display operation unit 30 during the standby of the image forming apparatus 1. The setting of the set information with regard to sample paper ejection is also included in each setting to be input at this time. The setting of the set information is concretely the setting of an image for sample paper ejection in automatic sample paper ejecting processing, and the like.

Incidentally, these settings are as described with reference to FIGS. 4-6.

Incidentally, if a plurality of jobs is continuously subjected to image formation, then the setting of the instruction information can be performed to each job.

First, at Step S11, the control section 809 performs setting processing of reading the set content of the job from the nonvolatile memory 810 to the internal memory of the control section 809, performing various initial settings, and the like.

Next, at Step S12, the control section 809 communicates with the display control section 303 and the printer control section 402 equipped in the display operation unit 30 and the printer unit 40, respectively, to check whether the preparation of starting the job has been arranged or not, and then the control section 809 starts the processing operation of the image formation.

Next, at Step S13, the control section 809 performs paper feeding processing of performing the paper feeding of a paper to be an object of the image forming processing from the paper feeding trays 51-53 or the paper feeding unit 54.

Next, at Step S14, the control section 809 performs the image forming processing (image forming process) of performing image formation on the paper conveyed to the conveyance path 41 by operating the image forming section 42.

Next, at Step S15, the control section 809 performs paper ejecting processing for ejecting the paper subjected to the image formation to the paper ejecting mechanism 60.

Next, at Step S16, the control section 809 judges whether the job ends or not, and returns the processing to that at Step S13 to repeat the processing on and after Step S13 until the job ends, that is, until the end of the image formation for the set number of copies each including set pages to this job.

Figure 8:
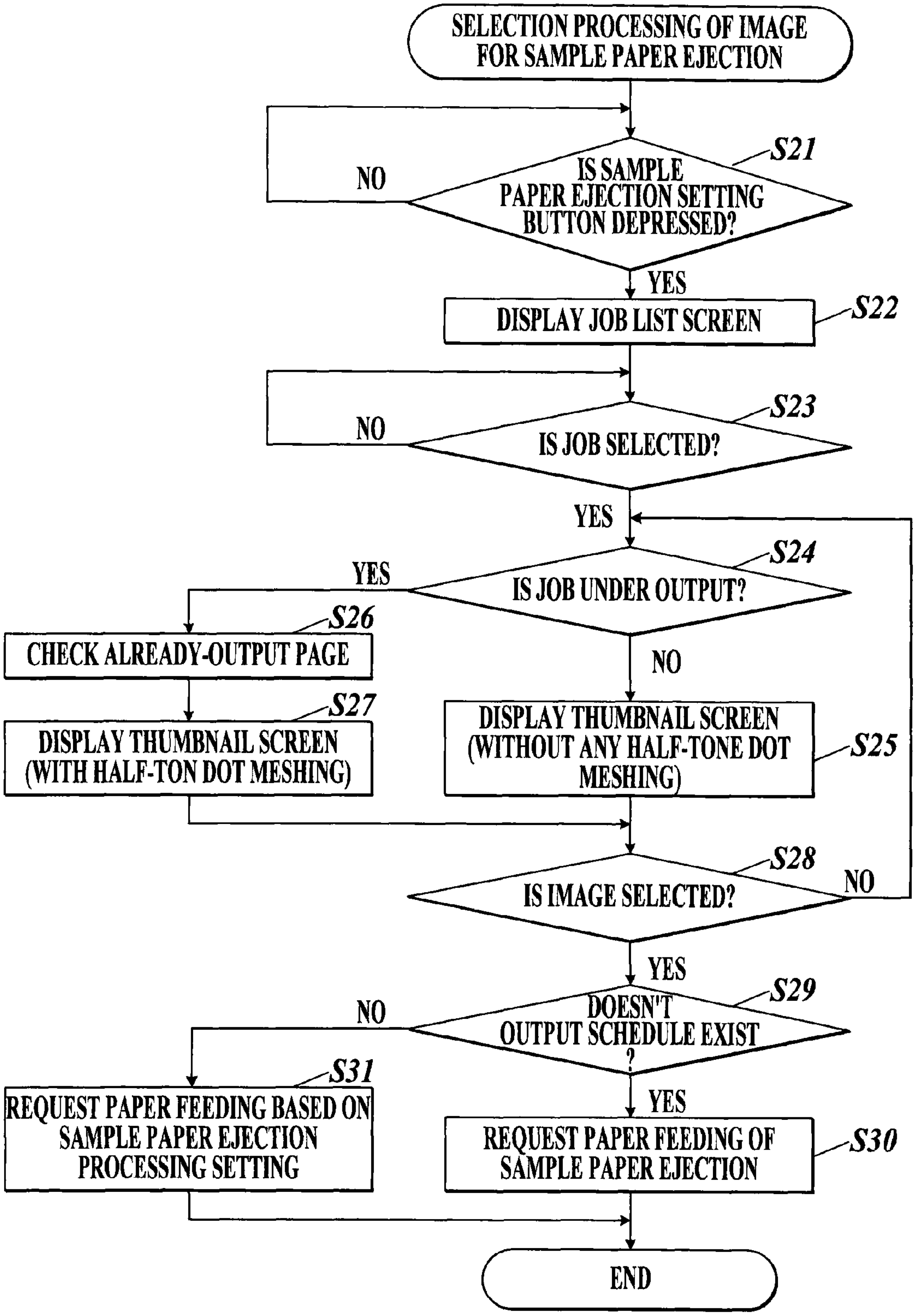
FIG. 8 is a flow chart showing processing processes of selection processing of an image for sample paper ejection.

FIG. 8 is a flow chart showing the processing processes of the selection processing of an image for sample paper ejection.

First, at Step S21, the control section 809 judges whether the sample paper ejection setting button A3 (see FIG. 4) is depressed or not. If the sample paper ejection setting button A3 is not depressed (Step S21: NO), then the control section 809 repeats the processing at Step S21.

On the other hand, if the sample paper ejection setting button A3 is depressed (Step S21: YES), then the control section 809 displays a job list screen (not shown) at the successive Step S22. Incidentally, in the job list screen, the job being executed presently and a job waiting the execution thereof (on standby) are displayed in a list in the order of the reservations thereof.

Next, at Step S23, the control section 809 judges whether a user selects a job on the job list screen or not. If no jobs are selected (Step S23: NO), then the control section 809 repeats the processing at Step S23.

On the other hand, if a job is selected (Step S23: YES), then the control section 809 judges whether the selected job is the one under output or not at the successive Step S24. If the control section 809 judges that the selected job is not the one under output (Step S24: NO), then the control section 809 displays the thumbnail screen G in which all the page images P are not subjected to the half-tone dot meshing (second control process) (see FIG. 5) at the successive Step S25, and the control section 809 moves the processing to that at Step S28.

On the other hand, if the control section 809 judges that the selected job is the one under output (Step S24: YES), then the control section 809 checks the already-output pages at the successive Step S26, and displays the thumbnail screen Gin which half-tone dot meshing is performed to the already-output page images P (second control process) (see FIG. 6) at the successive Step S27. Then, the control section 809 moves the processing to that at Step S28.

Next, at Step S28, the control section 809 judges whether the user selects an image for sample paper ejection on the thumbnail screen G (selection process) or not. If the user does not select any images for sample paper ejection (Step S28: NO), the control section 809 returns the processing to that at Step S24, and repeats the processing on and after Step S24.

On the other hand, if the control section 809 judges that the user selects an image for sample paper ejection (Step S28: YES), then the control section 809 judges whether the outputs for the number of copies scheduled to the selected image for sample paper ejection have been completed or not, that is, whether the selected page image is not scheduled to be output hereafter or not, at the successive Step S29. If the control section 809 judges that the selected page image is not scheduled to be output hereafter (Step S29: NO), then the control section 809 requests paper feeding of the page image as a sample paper ejection (an instruct of manual sample paper ejection) (first control process) at the successive Step S30, and the control section 809 ends the present processing.

On the other hand, if the control section 809 judges that the selected page image is scheduled to be output hereafter (Step S29: YES), then the control section 809 requests paper feeding on the basis of a previously set sample paper ejection period setting (automatic sample paper ejection processing setting) (first control process) at the successive Step S31, and the control section 809 ends the present processing.

Incidentally, it is also possible to select a plurality of page images as the images for sample paper ejection by depressing the continuous selection button G21 on the thumbnail screen G. If a plurality of page images is selected, then the processing at Steps S29 and S30 is performed to each page image to execute the sample paper ejection of each page image.

Moreover, if a page image that is not scheduled to be output hereafter is included from the plurality of page images, the paper feeding request of a sample paper ejection at Step S30 may be performed to all the selected page images.

Figure 9:
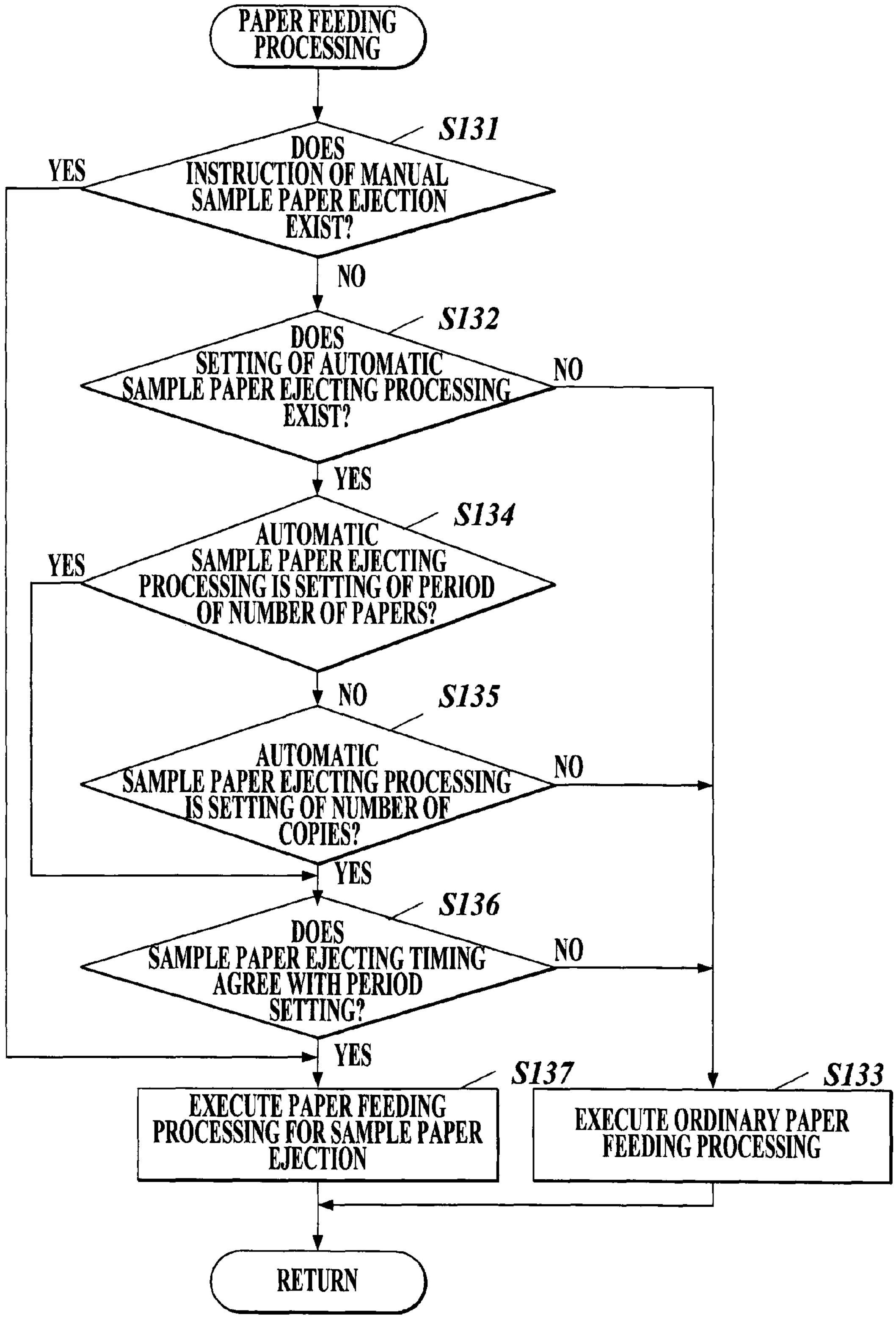
FIG. 9 is a flow charge showing processing processes of paper feeding processing show in FIG. 7.

FIG. 9 is a flow charge showing the processing processes of the paper feeding processing at Step S13 of FIG. 7.

When the processing moves to the paper feeding processing, the control section 809 judges whether there is any instruction of manual sample paper ejection or not at Step S131. If the instruction of the manual sample paper ejection exists (Step S131: YES), then the control section 809 moves the processing to that at Step S137.

On the other hand, if the instruction of the manual sample paper ejection does not exist (Step S131: NO), then the control section 809 judges whether there is any setting of automatic sample paper ejecting processing or not at the successive Step S132. If the setting of the automatic sample paper ejecting processing does not exist (Step S132: NO), then the control section 809 performs the paper feeding processing for ordinary paper ejection to eject the paper onto the stacker 60 at the successive Step S133.

On the other hand, if the setting of the automatic sample paper ejecting processing exists (Step S132: YES), then the control section 809 judges whether the setting of the automatic sample paper ejecting processing is the setting of the period of the number of sheets or not at the successive Step S134. If the control section 809 judges that the setting of the automatic sample paper ejecting processing is the setting of the period of the number of sheets (Step S134: YES), then the control section 809 moves the processing to that at Step S136, which will be described later.

On the other hand, if the control section 809 judges that the setting of the automatic sample paper ejecting processing is not the setting of the period of the number of sheets (Step S134: NO), then the control section 809 judges whether the setting of the automatic sample paper ejecting processing is the setting by the copy or not at the successive Step S135. If the control section 809 judges that the setting of the automatic sample paper ejecting processing is not the setting by the copy (Step S135: NO), then the control section 809 moves the processing to that at Step S133.

On the other hand, if the control section 809 judges that the setting of the automatic sample paper ejecting processing is the setting by the copy (Step S135: YES), then the control section 809 judges whether timing is the sample paper ejecting timing agreeing with the set period setting or not at the successive Step S136. If the control section 809 judges that the timing is not the sample paper ejecting timing agreeing with the set period setting (Step S136: NO), then the control section 809 moves the processing to that at Step S133 (first control process).

On the other hand, if the control section 809 judges that the timing is the sample paper ejecting timing agreeing with the set period setting (Step S136: YES), then the control section 809 executes paper feeding processing for sample paper ejection for ejecting the paper to the catch tray 62 (first control process) at the successive Step S137, and the control section 809 ends the present processing.

Figure 10:
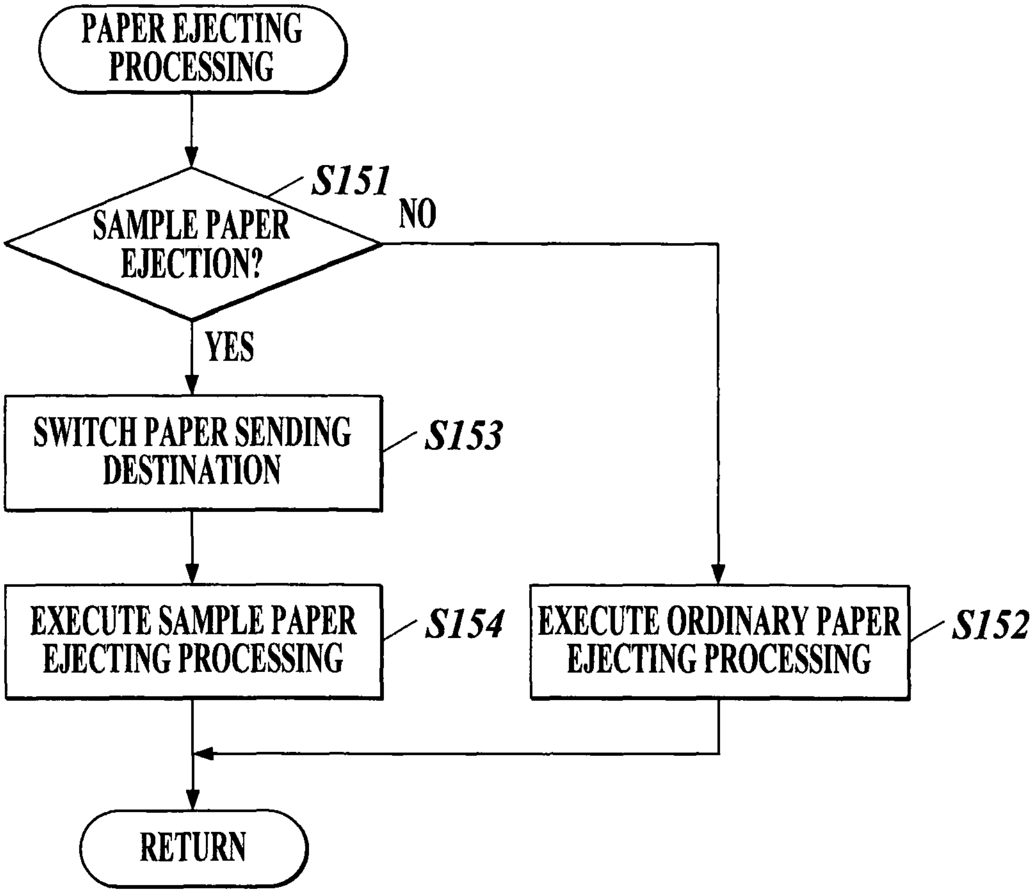
FIG. 10 is a flow chart showing processing processes of paper ejecting processing shown in FIG. 7.

FIG. 10 is a flow chart showing the processing processes of the paper ejecting processing at Step S15 of FIG. 7.

When the processing moves to this paper ejecting processing, at Step S151, the control section 809 judges whether the paper to be ejected is that of the sample paper ejection or not.

Then, if the control section 809 judges that the paper to be ejected is not that of the sample paper ejection (Step S151: NO), then the control section 809 performs the ordinary paper ejecting processing of ejecting the paper to the stacker 61 (first paper ejection step) at the successive Step S152, and the control section 809 ends the present processing.

On the other hand, if the control section 809 judges that the paper to be ejected is that of the sample paper ejection (Step S151: YES), then the control section 809 rotates the switching pieces 64 and 65 with the switching actuator 602 to switch the paper sending destination from the conveyance path 63*c* to the conveyance path 63*b* at the successive Step S153 (switching process).

Next, at Step S154, the control section 809 performs the sample paper ejecting processing to eject the paper to the catch tray 62 (second paper ejection step), and the control section 809 ends the present processing.

Incidentally, if the sample paper ejection ends in the sample paper ejecting processing, then the control section 809 rotates the switching pieces 64 and 65 with the switching actuator 602 to switch the paper sending destination from the conveyance path 63*b* to the conveyance path 63*c*.

As described above, because the image forming apparatus of the present embodiment is configured so as to be able to select an image for sample paper ejection by viewing thumbnail images, it is possible to select an image the aged deterioration of which can be easily found by actually viewing the images. Consequently, it becomes possible to select an image suitable for sample paper ejection. Thereby, it is possible to reduce the trouble of executing sample paper ejection once and re-trying the sample paper ejection if the image of the sample paper is not suitable for the sample paper ejection, or the like, and to curtail an unnecessary expense for sample paper ejection.

Moreover, if the selected image for sample paper ejection is an image scheduled to be output to the first paper ejection unit hereafter, then sample paper ejection can be performed at the output timing of the image for sample paper ejection. Consequently, the sample paper ejection can be performed efficiently without changing the order of image forming processing.

Moreover, even if the selected image for sample paper ejection is an image not to be scheduled to be ejected as the image of sample paper ejection, the image can be ejected as the sample paper ejection.

Moreover, in the case of a job of performing the image formation of a plurality of copies, sample paper ejection is performed when the time becomes the period of outputting a paper on which an image for sample paper ejection specified on the thumbnail screen is formed. Consequently, the same image is always output as the sample in the job of outputting the plurality of copies, and the aged deterioration of the image can be easily recognized at a glance.

Incidentally, the present invention is not limited to the embodiment described above, but can be suitably changed.

For example, when the selection of an image for sample paper ejection is performed in the course of image forming processing, it is also possible to perform sample paper ejection at the timing when the sample paper ejection instruction of the image for sample paper ejection is performed independent of the time before or after the output of the selected image for sample paper ejection. To put it concretely, the control section 809 moves its processing from that at Step S28 of FIG. 8 to Step S30 without executing the processing at Step S29 (first control process).

In the case of configuring the sample paper ejection method as above, an image for sample paper ejection specified in the course of image forming processing can be rapidly checked.

Moreover, although the aforesaid embodiment is configured so as to be able to select a page image P as an image for sample paper ejection even if the page image P is subjected to half-tone dot meshing (the output thereof has been completed), it may be prohibited to select the page image P subjected to the half-tone dot meshing (the output thereof has been completed) as the image for sample paper ejection.

In accordance with a first aspect of the present invention, an image forming system, comprises:

an image formation unit for forming an image relating to a job on a paper;

a first paper ejection unit for receiving the paper on which the image is formed;

a second paper ejection unit for receiving the paper as a sample paper on which the image is formed in a state that the sample paper is visually checked when sample paper ejection is performed;

a switching section for switching a paper sending destination between the first paper ejection unit and the second paper ejection unit;

a first control section for controlling the switching section to eject the sample paper by switching the paper sending destination from the first paper ejection unit to the second paper ejection unit at a time of the sample paper ejection;

a storing section for storing image data of the image relating to the job;

a second control section for controlling a display section to display thumbnail images based on the image data stored in the storing section; and a selecting section for selecting the image for sample paper ejection to be used for the sample paper ejection from the thumbnail images displayed in the display section on the basis of a user's operation, wherein the first control section performs the sample paper ejection using the image for sample paper ejection selected by the selecting section.

In accordance with a second aspect of the present invention of the image forming system according to the first aspect, when the image for sample paper ejection is selected by the selecting section on the basis of the user's operation during image forming processing by the image formation unit, and if the selected image for sample paper ejection is an image scheduled to be output to the first paper ejection unit, then the first control section performs the sample paper ejection at output timing when the scheduled image is output to the first paper ejection unit.

In accordance with a third aspect of the present invention of the image forming system according to the first aspect, when the image for sample paper ejection is selected by the selecting section on the basis of the user's operation during image forming processing by the image formation unit, and if the selected image for sample paper ejection is an image not scheduled to be output to the first paper ejection unit, then the first control section performs the sample paper ejection at timing when the sample paper ejection of the image for sample paper ejection is instructed.

In accordance with a fourth aspect of the present invention of the image forming system according to the first aspect, when the image for sample paper ejection is selected by the selecting section on the basis of the user's operation during image forming processing by the image formation unit, the first control section performs the sample paper ejection at timing when the sample paper ejection of the image for sample paper ejection is instructed.

In accordance with a fifth aspect of the present invention of the image forming system according to the first aspect, the first control section specifies a period in which the paper on which the image for sample paper ejection is formed is output as a sample paper ejection output period if the job is that of performing a plurality of copies of image formation, and the first control section controls the switching section to perform the sample paper ejection by switching the paper sending destination from the first paper ejection unit to the second paper ejection unit when time becomes to the sample paper ejection output period during image forming processing by the image formation unit.

In accordance with a sixth aspect of the present invention, an image forming method, comprises:

an image formation step of forming an image relating to a job on a paper;

a first paper ejection step of receiving the paper on which the image is formed by a first paper ejection unit;

a second paper ejection step of receiving the paper as a sample paper on which the image is formed by a second paper ejection unit in a state that the sample paper is visually checked when sample paper ejection is performed;

a switching step of switching a paper sending destination between the first paper ejection unit and the second paper ejection unit by a switching section;

a first control step of controlling the switching section to eject the sample paper by switching the paper sending destination from the first paper ejection unit to the second paper ejection unit at a time of the sample paper ejection;

a storing step of storing image data of the image relating to the job;

a second control step of controlling a display section to display thumbnail images based on the image data stored in the storing step; and a selecting step of selecting the image for sample paper ejection to be used for the sample paper ejection from the thumbnail images displayed in the display section on the basis of a user's operation, wherein the first control step performs the sample paper ejection using the image for sample paper ejection selected by the selecting step.

In accordance with a seventh aspect of the present invention of the image forming method according to the sixth aspect, when the image for sample paper ejection is selected by the selecting step on the basis of the user's operation during image forming processing by the image formation step, and if the selected image for sample paper ejection is an image scheduled to be output to the first paper ejection unit, then the first control step performs the sample paper ejection at output timing when the scheduled image is output to the first paper ejection unit.

In accordance with a eighth aspect of the present invention of the image forming method according to the sixth aspect, when the image for sample paper ejection is selected by the selecting step on the basis of the user's operation during image forming processing by the image formation step, and if the selected image for sample paper ejection is an image not scheduled to be output to the first paper ejection unit, then the first control step performs the sample paper ejection at timing when the sample paper ejection of the image for sample paper ejection is instructed.

In accordance with a ninth aspect of the present invention of the image forming method according to the sixth aspect, wherein when the image for sample paper ejection is selected by the selecting step on the basis of the user's operation during image forming processing by the image formation step, the first control step performs the sample paper ejection at timing when the sample paper ejection of the image for sample paper ejection is instructed.

In accordance with a tenth aspect of the present invention of the image forming method according to the sixth aspect, the first control step specifies a period in which the paper on which the image for sample paper ejection is formed is output as a sample paper ejection output period if the job is that of performing a plurality of copies of image formation, and the first control step controls the switching section to perform the sample paper ejection by switching the paper sending destination from the first paper ejection unit to the second paper ejection unit when time becomes to the sample paper ejection output period during image forming processing by the image formation step.

According to first and sixth aspects, since thumbnail images can be seen to select an image for sample paper ejection, it is possible to select the image for sample paper ejection by viewing an actual image the aged deterioration of which is easy to find. Accordingly, since it is possible to select the image the aged deterioration of which is easy to find, it is possible to reduce the processes to perform sample paper ejection again after performing sample paper ejection using an image which is not suited for the sample paper ejection once, and reduce the costs for waste sample paper ejection.

According to the second and seventh aspects, it is possible to effectively perform sample paper ejection without changing an order of images to be formed because if the selected image for sample paper ejection is an image scheduled to be output to the first paper ejection unit, it is possible to perform the sample paper ejection at output timing when the scheduled image is output to the first paper ejection unit.

According to the third and eighth aspects, it is possible to perform sample paper ejection even if the selected image for sample paper ejection is an image not scheduled to be output to the first paper ejection unit.

According to the fourth and ninth aspects, it is possible to confirm a sample paper quickly because sample paper ejection is performed at timing when the sample paper ejection of an image for sample paper ejection is instructed.

According to the fifth and tenth aspects, a sample paper on which same image is formed is periodically output when a plurality of copies of image formation are output because sample paper ejection is performed when time becomes to the sample paper ejection output period during image forming processing by the image formation unit. Accordingly, it is possible to easily recognize an aged deterioration of image at glance.

Although various exemplary embodiments have been shown and described, the invention is not limited to the embodiments shown. Therefore, the scope of the invention is intended to be limited solely by the scope of the claims that follow.

The entire disclosure of Japanese Patent Applications No. 2008-270643 filed on Oct. 21, 2008 including specifications, claims, drawings and summaries are incorporated herein by reference in their entirety.

What is claimed is:

1. An image forming system, comprising:

an image formation unit for forming an image relating to a job currently under output on a paper;

a first paper ejection unit for receiving the paper on which the image is formed;

a second paper ejection unit for receiving the paper as a sample paper on which the image is formed in a state that the sample paper is visually checked when sample paper ejection is performed;

a switching section for switching a paper sending destination between the first paper ejection unit and the second paper ejection unit;

a first control section for controlling the switching section to eject the sample paper by switching the paper sending destination from the first paper ejection unit to the second paper ejection unit at a time of the sample paper ejection;

a storing section for storing image data of the image relating to the job;

a second control section for controlling a display section to display thumbnail images of already output pages of the job currently under output, based on the image data stored in the storing section; and a selecting section for selecting the image for sample paper ejection to be used for the sample paper ejection from the thumbnail images displayed in the display section by the second control section, on the basis of a user's operation, wherein the first control section performs the sample paper ejection using the image for sample paper ejection selected by the selecting section, and wherein when the image for sample paper ejection is selected by the selecting section on the basis of the user's operation during image forming processing by the image formation unit of the job currently under output, and if the selected image for sample paper ejection is an image scheduled to be output to the first paper ejection unit, then the first control section performs the sample paper ejection at output timing when the scheduled image is output to the first paper ejection unit.

2. An image forming system, comprising:

an image formation unit for forming an image relating to a job currently under output on a paper;

a first paper ejection unit for receiving the paper on which the image is formed;

a second paper ejection unit for receiving the paper as a sample paper on which the image is formed in a state that the sample paper is visually checked when sample paper ejection is performed;

a switching section for switching a paper sending destination between the first paper ejection unit and the second paper ejection unit;

a first control section for controlling the switching section to eject the sample paper by switching the paper sending destination from the first paper ejection unit to the second paper ejection unit at a time of the sample paper ejection;

a storing section for storing image data of the image relating to the job;

a second control section for controlling a display section to display thumbnail images of already output pages of the job currently under output, based on the image data stored in the storing section; and a selecting section for selecting the image for sample paper ejection to be used for the sample paper ejection from the thumbnail images displayed in the display section by the second control section, on the basis of a user's operation, wherein the first control section performs the sample paper ejection using the image for sample paper ejection selected by the selecting section, and when the image for sample paper ejection is selected by the selecting section on the basis of the user's operation during image forming processing by the image formation unit of the job currently under output, and if the selected image for sample paper ejection is an image not scheduled to be output to the first paper ejection unit, then the first control section performs the sample paper ejection at timing when the sample paper ejection of the image for sample paper ejection is instructed.

3. An image forming system, comprising:

an image formation unit for forming an image relating to a job currently under output on a paper;

a first paper ejection unit for receiving the paper on which the image is formed;

a second paper ejection unit for receiving the paper as a sample paper on which the image is formed in a state that the sample paper is visually checked when sample paper ejection is performed;

a switching section for switching a paper sending destination between the first paper ejection unit and the second paper ejection unit;

a first control section for controlling the switching section to eject the sample paper by switching the paper sending destination from the first paper ejection unit to the second paper ejection unit at a time of the sample paper ejection;

a storing section for storing image data of the image relating to the job;

a second control section for controlling a display section to display thumbnail images of already output pages of the job currently under output, based on the image data stored in the storing section; and a selecting section for selecting the image for sample paper ejection to be used for the sample paper ejection from the thumbnail images displayed in the display section by the second control section, on the basis of a user's operation, wherein the first control section performs the sample paper ejection using the image for sample paper ejection selected by the selecting section, and when the image for sample paper ejection is selected by the selecting section on the basis of the user's operation during image forming processing by the image formation unit of the job currently under output, the first control section performs the sample paper ejection at timing when the sample paper ejection of the image for sample paper ejection is instructed.

4. An image forming method, comprising:

an image formation step of forming an image relating to a job currently under output on a paper;

a first paper ejection step of receiving the paper on which the image is formed by a first paper ejection unit;

a second paper ejection step of receiving the paper as a sample paper on which the image is formed by a second paper ejection unit in a state that the sample paper is visually checked when sample paper ejection is performed;

a switching step of switching a paper sending destination between the first paper ejection unit and the second paper ejection unit by a switching section;

a first control step of controlling the switching section to eject the sample paper by switching the paper sending destination from the first paper ejection unit to the second paper ejection unit at a time of the sample paper ejection;

a storing step of storing image data of the image relating to the job;

a second control step of controlling a display section to display thumbnail images of already output pages of the job currently under output, based on the image data stored in the storing step; and a selecting step of selecting the image for sample paper ejection to be used for the sample paper ejection from the thumbnail images displayed in the display section by the second control step, on the basis of a user's operation, wherein the first control step performs the sample paper ejection using the image for sample paper ejection selected by the selecting step, and when the image for sample paper ejection is selected by the selecting step on the basis of the user's operation during image forming processing by the image formation step of the job currently under output, and if the selected image for sample paper ejection is an image scheduled to be output to the first paper ejection unit, then the first control step performs the sample paper ejection at output timing when the scheduled image is output to the first paper ejection unit.

5. An image forming method, comprising:

an image formation step of forming an image relating to a job currently under output on a paper;

a first paper ejection step of receiving the paper on which the image is formed by a first paper ejection unit;

a second paper ejection step of receiving the paper as a sample paper on which the image is formed by a second paper ejection unit in a state that the sample paper is visually checked when sample paper ejection is performed;

a switching step of switching a paper sending destination between the first paper ejection unit and the second paper ejection unit by a switching section;

a first control step of controlling the switching section to eject the sample paper by switching the paper sending destination from the first paper ejection unit to the second paper ejection unit at a time of the sample paper ejection;

a storing step of storing image data of the image relating to the job;

a second control step of controlling a display section to display thumbnail images of already output pages of the job currently under output, based on the image data stored in the storing step; and a selecting step of selecting the image for sample paper ejection to be used for the sample paper ejection from the thumbnail images displayed in the display section by the second control section, on the basis of a user's operation, wherein the first control step performs the sample paper ejection using the image for sample paper ejection selected by the selecting step, and when the image for sample paper ejection is selected by the selecting step on the basis of the user's operation during image forming processing by the image formation step of the job currently under output, and if the selected image for sample paper ejection is an image not scheduled to be output to the first paper ejection unit, then the first control step performs the sample paper ejection at timing when the sample paper ejection of the image for sample paper ejection is instructed.

6. An image forming method, comprising:

an image formation step of forming an image relating to a job currently under output on a paper;

a first paper ejection step of receiving the paper on which the image is formed by a first paper ejection unit;

a second paper ejection step of receiving the paper as a sample paper on which the image is formed by a second paper ejection unit in a state that the sample paper is visually checked when sample paper ejection is performed;

a switching step of switching a paper sending destination between the first paper ejection unit and the second paper ejection unit by a switching section;

a first control step of controlling the switching section to eject the sample paper by switching the paper sending destination from the first paper ejection unit to the second paper ejection unit at a time of the sample paper ejection;

a storing step of storing image data of the image relating to the job;

a second control step of controlling a display section to display thumbnail images of already output pages of the job currently under output, based on the image data stored in the storing step; and a selecting step of selecting the image for sample paper ejection to be used for the sample paper ejection from the thumbnail images displayed in the display section by the second control step, on the basis of a user's operation, wherein the first control step performs the sample paper ejection using the image for sample paper ejection selected by the selecting step, and when the image for sample paper ejection is selected by the selecting step on the basis of the user's operation during image forming processing by the image formation step of the job currently under output, the first control step performs the sample paper ejection at timing when the sample paper ejection of the image for sample paper ejection is instructed.

* * * * *